(12) United States Patent
Lu et al.

(10) Patent No.: US 12,355,251 B2
(45) Date of Patent: Jul. 8, 2025

(54) ENERGY STORAGE SYSTEM AND CONTROL METHOD THEREOF

(71) Applicant: Delta Electronics, Inc., Taoyuan (TW)

(72) Inventors: Hsueh-Han Lu, Taoyuan (TW);
Ying-Chuan Huang, Taoyuan (TW);
Mu-Jhen Lin, Taoyuan (TW);
Chao-Yuan Lai, Taoyuan (TW);
Ya-Chen Chen, Taoyuan (TW);
Hung-Ren Lai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/532,859

(22) Filed: Dec. 7, 2023

(65) Prior Publication Data
US 2025/0088001 A1    Mar. 13, 2025

(30) Foreign Application Priority Data

Sep. 13, 2023   (CN) .......................... 202311178902.X

(51) Int. Cl.
*H02J 3/28*     (2006.01)
*H02J 7/00*     (2006.01)

(52) U.S. Cl.
CPC .............. *H02J 3/28* (2013.01); *H02J 7/0048* (2020.01); *H02J 7/00712* (2020.01); *H02J 2203/10* (2020.01)

(58) Field of Classification Search
CPC ........ H02J 3/28; H02J 7/0048; H02J 7/00712; H02J 2203/10
See application file for complete search history.

(56) References Cited

U.S. PATENT DOCUMENTS

| | | | | |
|---|---|---|---|---|
| 7,839,027 | B2 * | 11/2010 | Shelton ................. | H02J 7/0048 307/102 |
| 10,014,685 | B2 * | 7/2018 | Triebel ...................... | H02J 3/32 |
| 10,199,988 | B2 * | 2/2019 | An ............................ | H02J 3/36 |

(Continued)

FOREIGN PATENT DOCUMENTS

| | | |
|---|---|---|
| CN | 103187750 B | 12/2014 |
| CN | 104253439 A | 12/2014 |

(Continued)

*Primary Examiner* — Carlos Amaya
(74) *Attorney, Agent, or Firm* — KIRTON McCONKIE; Evan R. Witt

(57) ABSTRACT

An energy storage system and a control method thereof are provided. The control method includes steps of: (a) providing an energy storage system including N energy storage modules; (b) obtaining a first sequence and a second sequence by sorting the N energy storage units based on the quantity of electricity in descending order and ascending order respectively; (c) determining a required power of the power grid according to a grid frequency; (d) when the required power is positive, controlling first X energy storage units in the first sequence to discharge for collectively providing an electrical energy, having same magnitude with the required power, to the power grid; and (e) when the required power is negative, controlling first Y energy storage units in the second sequence to collectively receive an electrical energy, having same magnitude with the required power, from the power grid for charging.

18 Claims, 5 Drawing Sheets

(56) References Cited

U.S. PATENT DOCUMENTS

| | | | |
|---|---|---|---|
| 2022/0209545 A1 | 6/2022 | Wang et al. | |
| 2022/0360105 A1 | 11/2022 | Beaston et al. | |
| 2023/0187941 A1* | 6/2023 | Mitsugi | H02J 3/381 |
| | | | 307/82 |

FOREIGN PATENT DOCUMENTS

| | | |
|---|---|---|
| CN | 106253346 A | 12/2016 |
| CN | 106936219 A | 7/2017 |
| CN | 107681671 A | 2/2018 |
| CN | 209402163 U | 9/2019 |
| CN | 109193728 B | 8/2020 |
| CN | 114498772 A | 5/2022 |
| CN | 114678883 A | 6/2022 |
| CN | 114725960 B | 8/2022 |
| DE | 102013206808 A1 | 10/2014 |
| TW | 202042473 A | 11/2020 |
| TW | I747703 B | 1/2021 |

* cited by examiner

ENERGY STORAGE SYSTEM AND CONTROL METHOD THEREOF

CROSS-REFERENCE TO RELATED APPLICATION

This application claims priority to China Patent Application No. 202311178902.X filed on Sep. 13, 2023. The entire contents of the above-mentioned patent applications are incorporated herein by reference for all purposes.

FIELD OF THE INVENTION

The present disclosure relates to an energy storage system and a control method thereof, and more particularly to an energy storage system and a control method thereof capable of regulating the grid frequency and maintaining the dynamic balance of quantity of electricity simultaneously.

BACKGROUND OF THE INVENTION

Grid frequency is one of essential parameters of a power system which reflects the balance between power generation and load. Maintaining the supply and demand balance of the power grid is equivalent to maintaining the grid frequency within a certain range. Since the energy storage system has high control accuracy and rapid response speed, it is able to regulate the grid frequency effectively and would be the optimal support for maintaining the supply and demand balance of the power grid. When there is excess electricity generation on the power grid, the surplus energy may be stored in the energy storage system. Conversely, when the load of the power grid is too large, the energy storage system may discharge energy to the power grid. In recent years, the auxiliary service of power grid with the energy storage system has been increasingly utilized by countries around the world, and the purpose of this auxiliary service is to respond quickly to grid demands and to maintain the balance of the power grid continuously in the long term.

SUMMARY OF THE INVENTION

The present disclosure provides an energy storage system and a control method thereof in which the regulation for a grid frequency is achieved by controlling the charging and discharging of energy storage units, and the energy storage unit going to charge or discharge is determined according to quantity of electricity of all the energy storage units. Accordingly, the energy storage system and the control method thereof can maintain the balance of power grid by regulating the grid frequency. Meanwhile, the dynamic balance of quantity of electricity is maintained so that the energy storage unit is avoided to be in the full-load or low-load status. Consequently, the flexibility of power dispatch is enhanced, the lifespan of energy storage units is extended, and the reliability of the energy storage system operating continuously in the long-term is improved.

In accordance with an aspect of the present disclosure, a control method of an energy storage system is provided. The control method includes steps of: (a) providing an energy storage system including a power grid, an interconnection point and N energy storage modules, wherein N is an integer greater than 1, the interconnection point is electrically connected to the power grid, the N energy storage modules are electrically connected to the interconnection point respectively, each of the N energy storage modules includes a transformer, a power regulator and an energy storage unit electrically connected in series, and a high-voltage side and a low-voltage side of the transformer are electrically connected to the interconnection point and the power regulator respectively; (b) acquiring quantity of electricity of N energy storage units of the N energy storage modules, obtaining a first sequence by sorting the N energy storage units based on the quantity of electricity in descending order, and obtaining a second sequence by sorting the N energy storage units based on the quantity of electricity in ascending order; (c) determining a required power of the power grid according to a grid frequency of the power grid; (d) when the required power is positive, controlling first X energy storage units in the first sequence to discharge for collectively providing an electrical energy, having same magnitude with the required power, to the power grid, wherein X is a positive integer less than or equal to N; and (e) when the required power is negative, controlling first Y energy storage units in the second sequence to collectively receive an electrical energy, having same magnitude with the required power, from the power grid for charging, wherein Y is a positive integer less than or equal to N.

In accordance with another aspect of the present disclosure, an energy storage system is provided. The energy storage system includes a power grid, an interconnection point, N energy storage modules and a controller. The interconnection point is electrically connected to the power grid. The N energy storage modules are electrically connected to the interconnection point respectively, and N is an integer greater than 1. Each of the N energy storage modules includes a transformer, a power regulator and an energy storage unit electrically connected in series, and a high-voltage side and a low-voltage side of the transformer are electrically connected to the interconnection point and the power regulator respectively. The controller communicates with the N energy storage modules. The controller acquires quantity of electricity of N energy storage units of the N energy storage modules, obtains a first sequence by sorting the N energy storage units based on the quantity of electricity in descending order, and obtains a second sequence by sorting the N energy storage units based on the quantity of electricity in ascending order. The controller determines a required power of the power grid according to a grid frequency of the power grid. When the required power is positive, the controller controls first X energy storage units in the first sequence to discharge for collectively providing an electrical energy, having same magnitude with the required power, to the power grid, and X is a positive integer less than or equal to N. When the required power is negative, the controller controls first Y energy storage units in the second sequence to collectively receive an electrical energy, having same magnitude with the required power, from the power grid for charging, and Y is a positive integer less than or equal to N.

DETAILED DESCRIPTION OF THE PREFERRED EMBODIMENT

Figure 1:
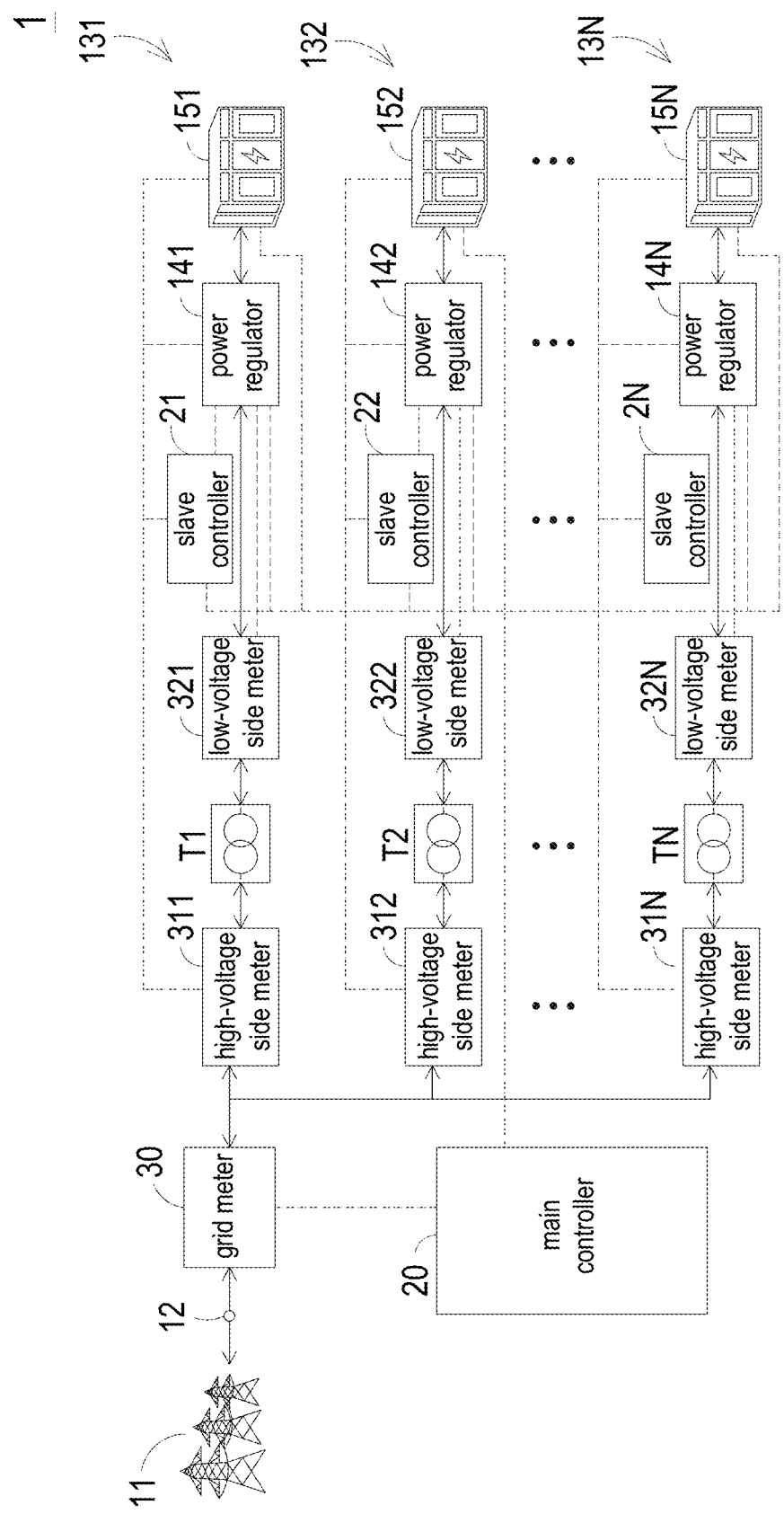
FIG. 1 is a schematic block diagram illustrating an energy storage system according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. FIG. 1 is a schematic block diagram illustrating an energy storage system according to an embodiment of the present disclosure. In FIG. 1, the electrical connection relation and the communication relation are depicted by solid lines and dashed lines respectively. As shown in FIG. 1, the energy storage system 1 includes a power grid 11, an interconnection point 12, N energy storage modules 131-13N and a controller, and N is an integer greater than 1. The interconnection point 12 is electrically connected to the power grid 11, and the N energy storage modules 131-13N are electrically connected to the interconnection point 12 respectively. Each energy storage module (131-13N) includes a transformer (T1-TN), a power regulator (141-14N), and an energy storage unit (151-15N) sequentially and electrically connected in series. The transformer (T1-TN) and the power regulator (141-14N) are configured for voltage conversion and power regulation respectively so as to realize the regulation for the power transmission between the energy storage unit (151-15N) and the power grid 11. Further, the high-voltage side and low-voltage side of the transformer (T1-TN) are electrically connected to the interconnection point 12 and the corresponding power regulator (141-14N) respectively. The controller is in communication with all the energy storage modules 131-13N and is configured to control the operation of the power regulators 141-14N and the energy storage units 151-15N.

In an embodiment, as shown in FIG. 1, the controller includes a main controller 20 and N slave controllers 21-2N in communication with each other. The N slave controllers 21-2N communicate with the components, including the transformer, the power regulator and the energy storage unit, of the N energy storage modules 131-13N respectively. The slave controllers 21-2N provide the operation information of the energy storage modules 131-13N to the main controller 20. According to the operation information of the power grid 11 and the energy storage modules 131-13N, the main controller 20 determines the operation of the overall energy storage system 1 and provides corresponding commands for the slave controllers 21-2N to control the operation of energy storage modules 131-13N. In addition, in an embodiment, each slave controller (21-2N) may communicate with all the energy storage modules 131-13N, and the energy storage module controlled by each slave controller (21-2N) is not limited and may be adjusted according to actual requirements. Further, the specific number of the slave controllers is not limited, and the communication relations between the slave controllers and the energy storage modules may be determined according to the specific number of the slave controllers.

In an embodiment, the energy storage system 1 further includes a grid meter 30 which is electrically connected to the interconnection point 12 and communicates with the main controller 20. The grid meter 30 is configured to read the grid frequency of the power grid 11 and provide it to the main controller 20. In an embodiment, each energy storage module (131-13N) further includes a high-voltage side meter (311-31N) and a low-voltage side meter (321-32N). The high-voltage side meter (311-31N) and the low-voltage side meter (321-32N) are electrically connected to the high-voltage side and the low-voltage side, respectively, of the corresponding transformer (T1-TN) for sensing the electrical energy information at respective locations. In an embodiment, the high-voltage side meter (311-31N) communicates with the corresponding slave controller (21-2N) so that the slave controller (21-2N) compensates for the error between the high-voltage side meter (311-31N) and the power regulator (141-14N).

Figure 2:
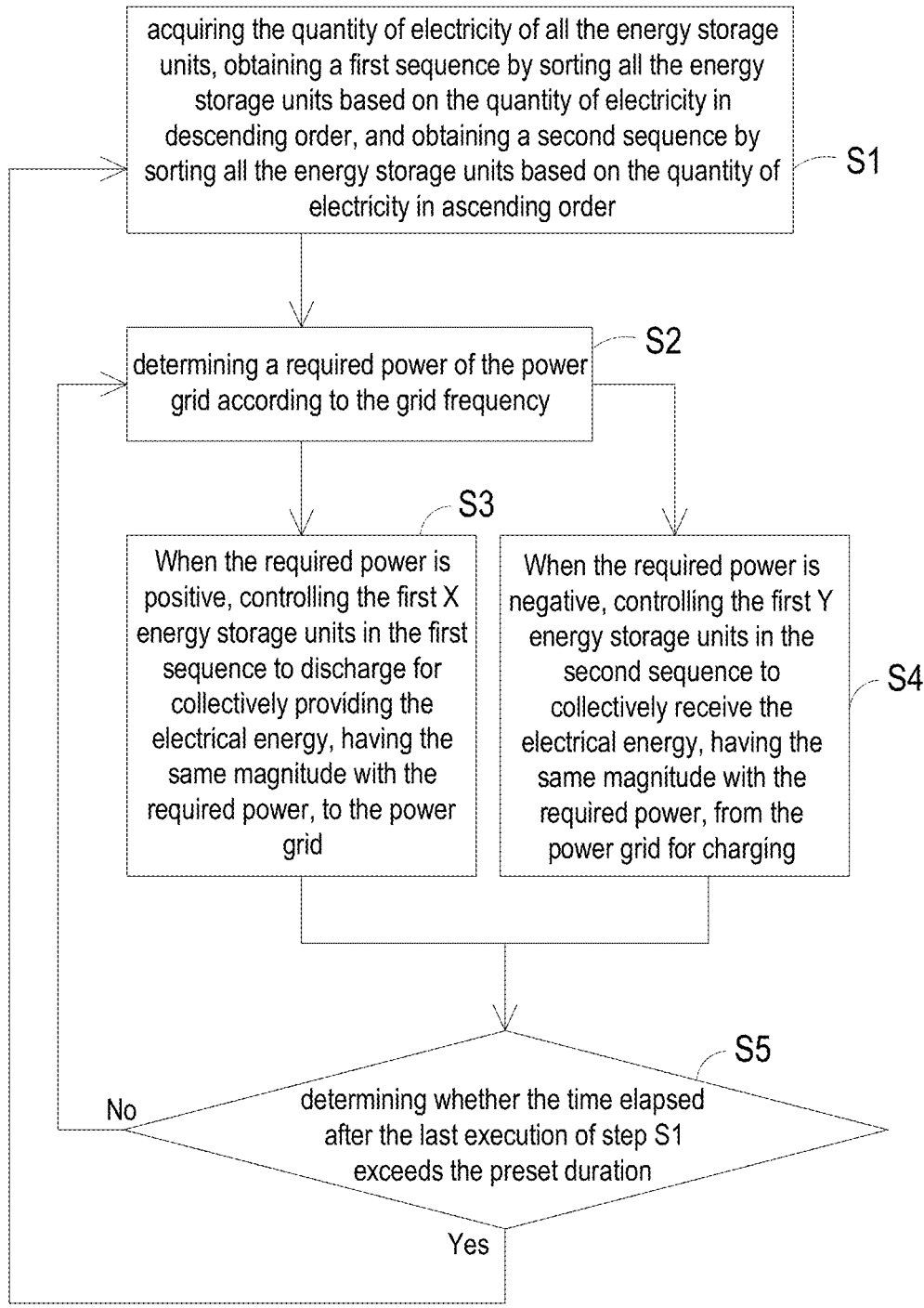
FIG. 2 is a schematic flow chart illustrating a control method of an energy storage system according to an embodiment of the present disclosure.

FIG. 2 is a schematic flow chart illustrating a control method of an energy storage system according to an embodiment of the present disclosure. The control method shown in FIG. 2 is applicable for the energy storage system 1 shown in FIG. 1. The control method of the energy storage system of the present disclosure would be described in detail according to FIG. 1 and FIG. 2. It is noted that the control method of the energy storage system 1 of the present disclosure is performed by the controller of the energy storage system 1, which would not be repeated in the following descriptions.

As shown in FIG. 1 and FIG. 2, firstly, the quantity of electricity of all the energy storage units 151-15N are acquired, and a first sequence is obtained by sorting all the energy storage units 151-15N based on the quantity of electricity in descending order, and a second sequence is obtained by sorting all the energy storage units 151-15N based on the quantity of electricity in ascending order (Step S1). Then, a required power of the power grid 11 is determined according to the grid frequency of the power grid 11 (Step S2). When the required power of the power grid 11 is positive (i.e., the energy storage system 1 needs to supply power to the power grid 11 for regulating the grid frequency), the first X energy storage units in the first sequence are controlled to discharge for collectively providing the electrical energy, having the same magnitude with the required power, to the power grid 11, and X is a positive integer less than or equal to N (Step S3). Alternatively, when the required power of the power grid 11 is negative (i.e., the energy storage system 1 needs to receive power from the power grid 11 for regulating the grid frequency), the first Y energy storage units in the second sequence are controlled to collectively receive the electrical energy, having the same magnitude with the required power, from the power grid 11 for charging, and Y is a positive integer less than or equal to N (Step S4). In an embodiment, if the time elapsed after performing the step S1 exceeds a preset duration, the step S1 is performed again. For example, the control method further includes a step S5 of determining whether the time elapsed after the last execution of step S1 exceeds the preset duration. If the determination result of step S5 is positive, the step S1 is performed again; and if the determination result of step S5 is negative, the step S2 is performed again.

Consequently, in the present disclosure, the regulation for the grid frequency is achieved by controlling the charging and discharging of the energy storage units, and the energy storage unit going to charge or discharge is determined according to the quantity of electricity of all the energy storage units 151-15N. In specific, when the energy storage system 1 needs to supply electrical energy to the power grid 11, the energy storage unit with higher quantity of electricity is controlled to discharge according to the first sequence. Alternatively, when the energy storage system 1 needs to receive electrical energy from the power grid 11, the energy storage unit with lower quantity of electricity, is controlled to charge according to the second sequence. Accordingly, the energy storage system 1 and the control method thereof of the present disclosure can maintain the balance of power grid by regulating the grid frequency. Meanwhile, the dynamic balance of the quantity of electricity of the energy storage units 151-15N is maintained so that the energy storage units 151-15N is avoided to be in the full-load or low-load status. Consequently, the flexibility of power dispatch is enhanced, the lifespan of energy storage units is extended, and the reliability of the energy storage system 1 operating continuously in the long-term is improved.

According to the foregoing control method, after the required power of the power grid 11 is determined, the energy storage system 1 is controlled to provide electrical energy to the power grid 11 or receive electrical energy from the power grid 11 for regulating the grid frequency and maintaining the balance of power grid. It is noted that the specific way of determining the required power of the power grid 11 depends on the frequency-power relation curve of the power grid 11. Several examples of the frequency-power relation curve of the power grid 11 and the corresponding ways of determining the required power are exemplified as follows, but the actual specifications of the power grid 11 applicable to the present disclosure are not limited thereto.

Figure 3A:
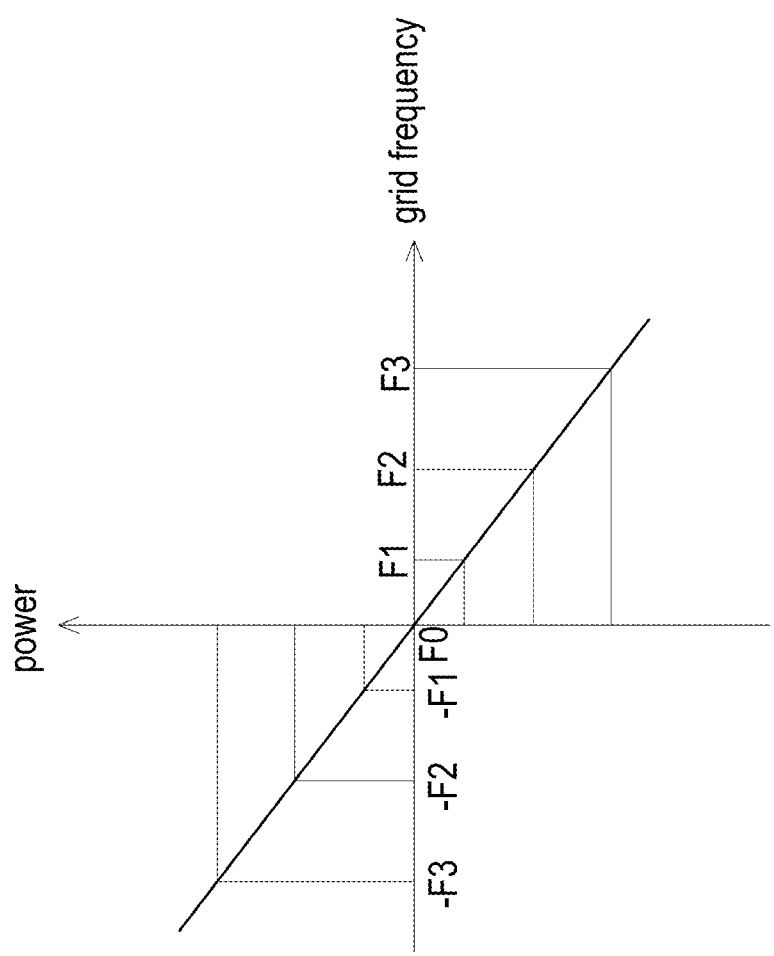
FIG. 3A, FIG. 3B and FIG. 3C exemplify various kinds of frequency-power relation curves of the power grid.

In an embodiment, according to the frequency-power relation curve of the power grid 11 as shown in FIG. 3A, the grid frequency corresponds to a certain power. Under this circumstance, the power corresponding to the grid frequency is regarded as the required power of the power grid 11. When the grid frequency is lower than the foundation frequency F0, the required power is positive, and the step S3 of the control method is performed till the grid frequency increases to the foundation frequency F0. Alternatively, when the grid frequency is higher than the foundation frequency F0, the required power is negative, and the step S4 of the control method is performed till the grid frequency decreases to the foundation frequency F0.

Figure 3B:
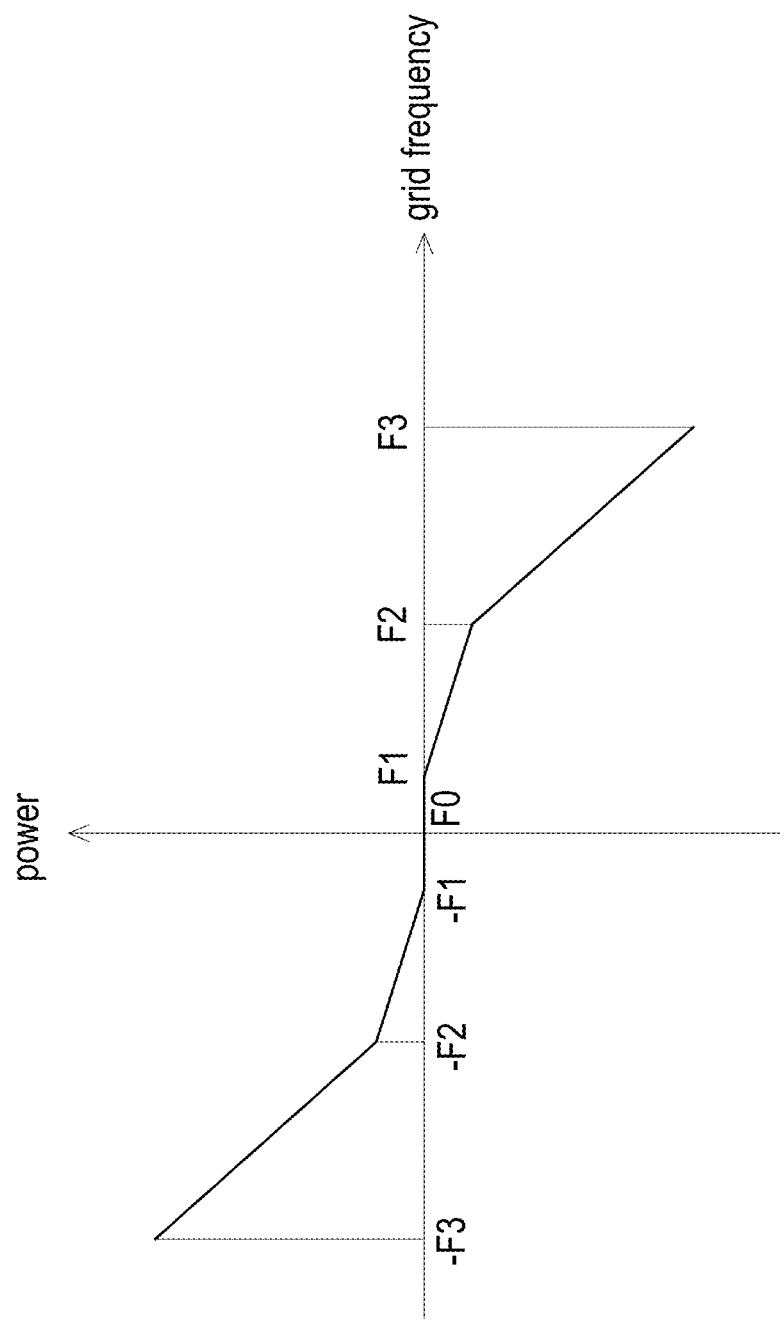

In another embodiment, according to the frequency-power relation curve of the power grid 11 as shown in FIG. 3B, the grid frequency corresponds to a certain power. Under this circumstance, the power corresponding to the grid frequency is regarded as the required power of the power grid 11. When the grid frequency is lower than the foundation frequency, the required power is positive (as shown in FIG. 3B, the grid frequency is between −F3 and −F1), and the step S3 of the control method is performed till the grid frequency increases to fall within the foundation frequency interval between −F1 and F1. Alternatively, when the grid frequency is higher than the foundation frequency, the required power is negative (as shown in FIG. 3B, the grid frequency is between F1 and F3), and the step S4 of the control method is performed till the grid frequency decreases to fall within the foundation frequency interval between −F1 and F1. When the grid frequency falls within the foundation frequency interval between −F1 and F1, the required power is zero, and thus the present grid frequency is maintained.

Figure 3C:
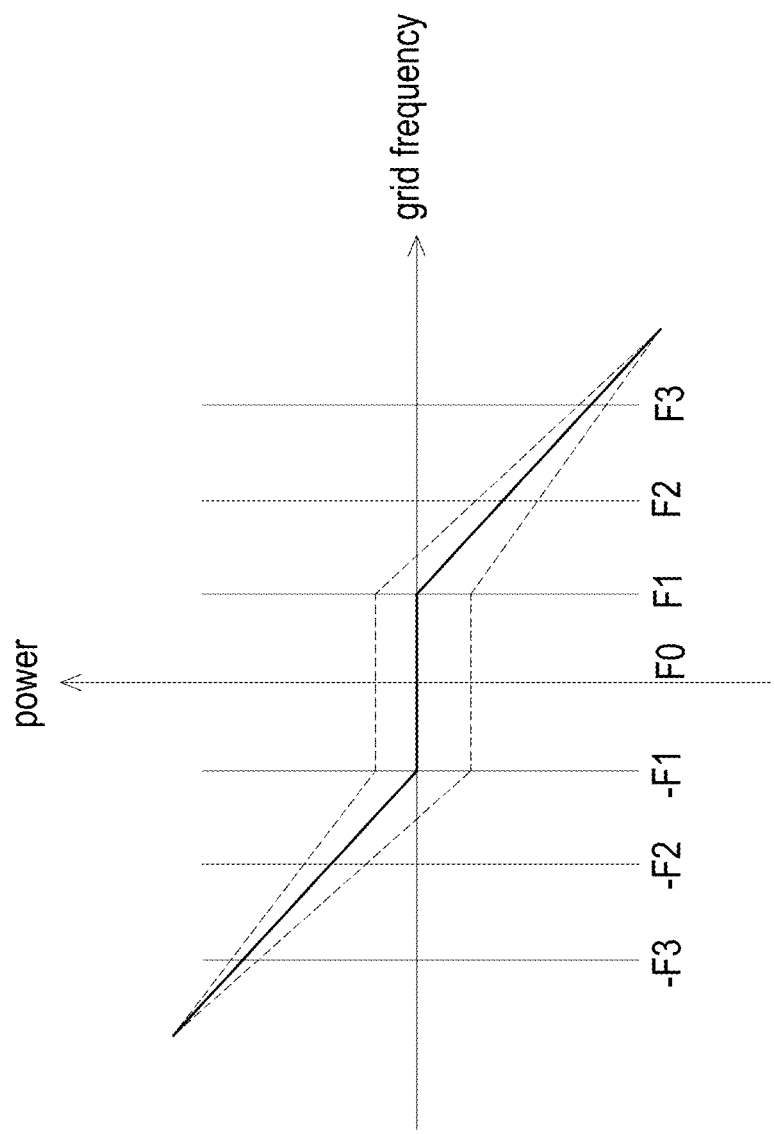

In another embodiment, according to the frequency-power relation curve of the power grid 11 as shown in FIG. 3C, the grid frequency corresponds to a power range (i.e., the range between two dashed-line curves in FIG. 3C). Under this circumstance, in the step S2 of the control method, the required power is determined according to the grid frequency and the average quantity of electricity of all the energy storage units 151-15N. After determining the required power, the step S3 or S4 of the control method is performed to adjust the grid frequency to fall within a frequency range. In particular, when the average quantity of electricity of all the energy storage units 151-15N is greater than a first threshold (i.e., the average quantity of electricity is relatively high), the required power is determined to equal the maximum value within the power range (corresponding to the upper dashed-line curve in FIG. 3C) so that the energy storage units 151-15N are avoided to reach the full-load status. When the average quantity of all the energy storage units 151-15N is less than a second threshold which is smaller than the first threshold (i.e., the average quantity of electricity is relatively low), the required power is determined to equal the minimum value within the power range (corresponding to the lower dashed-line curve in FIG. 3C) so that the energy storage units 151-15N are avoided to reach the low-load status. When the average quantity of electricity of all the energy storage units 151-15N is between the first threshold and the second threshold (i.e., the average quantity of electricity is moderate), the required power is determined to equal the middle value within the power range (corresponding to the solid-line curve in FIG. 3C which may be obtained by averaging the two dashed-line curves). Thereby, the energy storage units 151-15N are maintained to stay in the preset load status and are avoided to be in the full-load or low-load status. The specific values of the first and second thresholds may be set and adjusted according to actual requirements.

Consequently, the dynamic balance of the quantity of electricity of the energy storage units 151-15N is maintained so that the energy storage units are avoided to be in the full-load or low-load status.

In addition, in an embodiment, the control method of the energy storage system 1 further includes a step of adding up the maximum powers of all the power regulators 141-14N to obtain a total power and multiplying the total power by a preset percentage to obtain a total ideal power. The preset percentage is an optimal power output ratio determined through simulation and calculation, and its specific value depends on actual application conditions. When the magnitude of the required power is less than or equal to the total ideal power, the magnitude of the required power is relatively small. Under this circumstance, if all the energy storage units 151-15N are controlled to charge or discharge collectively, it may put the energy storage system 1 in a low-power state, resulting in low conversion efficiency of the power regulators 141-14N. Therefore, when the magnitude of the required power is less than or equal to the total ideal power, only some of the energy storage units are controlled to charge or discharge (i.e., X and Y in the steps S3 and S4 of the control method are both less than N), thereby avoiding the energy storage system 1 to operate in the low-power state and improving the operating efficiency. In addition, when the magnitude of the required power is greater than the total ideal power, the magnitude of the required power is relatively large. Under this circumstance, all the energy storage units 151-15N are controlled to charge or discharge collectively, namely X and Y in the steps S3 and S4 are both equal to N.

An implementation of determining the specific values of X and Y in the case that the magnitude of the required power is less than or equal to the total ideal power is exemplified as follows.

Taking the situation that the required power is positive as an example. Firstly, the first one energy storage unit in the first sequence is selected. Then, according to the magnitude of the required power and the maximum power and ideal power (equal to the product of the maximum power and the preset percentage) of the power regulator corresponding to the energy storage unit, whether the following conditions (i), (ii) and (iii) are satisfied is determined.

Condition (i): A sum of the ideal power(s) of the power regulator(s) corresponding to the selected energy storage unit(s) is greater than the magnitude of the required power.

Condition (ii): A sum of the ideal powers of the power regulators corresponding to the selected energy storage unit(s) and the energy storage unit next in the first sequence is greater than or equal to the magnitude of the required power.

Condition (iii): A sum of the maximum power(s) of the power regulator(s) corresponding to the selected energy storage unit(s) is greater than or equal to the magnitude of the required power.

If the condition (i) is satisfied (the conditions (ii) and (iii) are satisfied certainly) or if only the conditions (ii) and (iii) are satisfied, X is equal to the number of selected energy storage units. If the condition (i) is not satisfied and at least one of the conditions (ii) and (iii) is not satisfied, the energy storage unit next in the first sequence is additionally selected, and whether the foregoing conditions (i), (ii) and (iii) are satisfied is determined again based on the currently selected energy storage units.

When X is greater than 1, the value of X obtained through the above-mentioned condition determination ensures that the magnitude of the required power is greater than or equal to the product of the preset percentage and the sum of the maximum powers of the X power regulators corresponding to the first X energy storage units in the first sequence (i.e., the sum of the ideal powers). Additionally, the value of X ensures that the magnitude of the required power is less than or equal to the sum of the maximum powers of the X power regulators corresponding to the first X energy storage units in the first sequence. In other words, the actual output power of the power regulator corresponding to the energy storage unit which is discharging would be between the maximum power and the ideal power of this power regulator, thereby avoiding the energy storage system 1 to operate in the low-power state and improving the operating efficiency of the energy storage system 1.

In addition, when the required power is negative, the value of Y may be determined by the same way, and thus detailed descriptions thereof are omitted herein. When the required power is negative, the magnitude of the required power is greater than or equal to the product of the preset percentage and the sum of the maximum powers of the Y power regulators corresponding to the first Y energy storage units in the second sequence, and the magnitude of the required power is less than or equal to the sum of the maximum powers of the Y power regulators corresponding to the first Y energy storage units in the second sequence.

The following examples illustrates how to determine the energy storage unit going to charge or discharge and the output power thereof based on the control method of the present disclosure in the actual application environment.

In a first application environment, the foundation frequency is 50 Hz, the total power is 10 MW, N=4, the maximum power of each power regulator is 2.5 MW, and the preset percentage is 60%.

When the grid frequency is lower than 50 Hz and the magnitude of the required power is 2 MW (i.e., the energy storage system 1 needs to provide the electrical energy of 2 MW to the power grid 11), the first one energy storage unit in the first sequence and the corresponding power regulator discharges at 80% capacity (1*2.5 MW*80%=2 MW).

When the grid frequency is higher than 50 Hz and the magnitude of the required power is 3 MW (i.e., the energy storage system 1 needs to receive the electrical energy of 3 MW from the power grid 11), the first two energy storage unit in the second sequence and the corresponding power regulators is charged at 60% capacity (2*2.5 MW*60%=3 MW).

When the grid frequency is lower than 50 Hz and the magnitude of the required power is 5 MW (i.e., the energy storage system 1 needs to provide the electrical energy of 5 MW to the power grid 11), the first three energy storage unit in the first sequence and the corresponding power regulators discharges at 66.67% capacity (3*2.5 MW*66.67%=5 MW).

When the magnitude of the required power is greater than or equal to 6 MW, all the four energy storage units and the corresponding power regulators are controlled to charge or discharge collectively.

In a second application environment, the foundation frequency is 50 Hz, the total power is 5 MW, N=2, the maximum power of each power regulator is 2.5 MW, the preset percentage is 60%, and the ideal power of each power regulator is 1.5 MW.

For example, the grid frequency is lower than 50 Hz and the magnitude of the required power is 2.8 MW (i.e., the energy storage system 1 needs to provide the electrical energy of 2.8 MW to the power grid 11). Assuming that only the first one energy storage unit in the first sequence is selected, the ideal power (2.5 MW*60%=1.5 MW) and the maximum power of the corresponding power regulator are both less than the magnitude of the required power (i.e., the conditions (i) and (iii) are not satisfied). Further, the sum of the ideal powers of the power regulators corresponding to the selected energy storage unit and the energy storage unit next in the first sequence (=1.5 MW+1.5 MW=3 MW) is greater than the magnitude of the require power (i.e., the condition (ii) is satisfied). Since the conditions (i) and (iii) are not satisfied and the condition (ii) is satisfied, the energy storage unit next in the first sequence is additionally selected. Accordingly, the sum of the ideal powers of the power regulators corresponding to the first two energy storage units in the first sequence (3 MW) is greater than the magnitude of the required power, namely the condition (i) is satisfied, and thus the first two energy storage units in the first sequence and the corresponding power regulators discharges at 56% capacity (2*2.5 MW*56%=2.8 MW).

In summary, the present disclosure provides an energy storage system and a control method thereof in which the regulation for the grid frequency is achieved by controlling the charging and discharging of energy storage units, and the energy storage unit going to charge or discharge is determined according to the quantity of electricity of all the energy storage units. Accordingly, the energy storage system and the control method thereof can maintain the balance of power grid by regulating the grid frequency. Meanwhile, the dynamic balance of quantity of electricity is maintained so that the energy storage unit is avoided to be in the full-load or low-load status. Consequently, the flexibility of power dispatch is enhanced, the lifespan of energy storage units is extended, and the reliability of the energy storage system operating continuously in the long-term is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of an energy storage system, comprising steps of:
   (a) providing an energy storage system comprising a power grid, an interconnection point and N energy storage modules, wherein N is an integer greater than 1, the interconnection point is electrically connected to the power grid, the N energy storage modules are electrically connected to the interconnection point respectively, each of the N energy storage modules comprises a transformer, a power regulator and an energy storage unit electrically connected in series, and a high-voltage side and a low-voltage side of the transformer are electrically connected to the interconnection point and the power regulator respectively;
(b) acquiring quantity of electricity of N energy storage units of the N energy storage modules, obtaining a first sequence by sorting the N energy storage units based on the quantity of electricity in descending order, and obtaining a second sequence by sorting the N energy storage units based on the quantity of electricity in ascending order;
(c) determining a required power of the power grid according to a grid frequency of the power grid;
(d) when the required power is positive, controlling first X energy storage units in the first sequence to discharge for collectively providing an electrical energy, having same magnitude with the required power, to the power grid, wherein X is a positive integer less than or equal to N; and
(e) when the required power is negative, controlling first Y energy storage units in the second sequence to collectively receive an electrical energy, having same magnitude with the required power, from the power grid for charging, wherein Y is a positive integer less than or equal to N,
wherein the control method further comprises a step of adding maximum powers of N power regulators corresponding to the N energy storage units to obtain a total power and multiplying the total power by a preset percentage to obtain a total ideal power, wherein if a magnitude of the required power is less than or equal to the total ideal power, X and Y in the steps (d) and (e) are both less than N, and if the magnitude of the required power is greater than the total ideal power, X and Y in the steps (d) and (e) are both equal to N.

2. The control method according to claim 1, wherein according to a frequency-power relation curve of the power grid, the grid frequency corresponds to the required power; when the grid frequency is lower than a foundation frequency, the required power is positive, and the control method performs the step (d) till the grid frequency increases to the foundation frequency; and when the grid frequency is higher than the foundation frequency, the required power is negative, and the control method performs the step (e) till the grid frequency decreases to the foundation frequency.

3. The control method according to claim 2, wherein when the grid frequency falls within a frequency range comprising the foundation frequency, the required power is zero, and the control method maintains the grid frequency.

4. The control method according to claim 1, wherein if the grid frequency corresponds to a power range according to a frequency-power relation curve of the power grid, the required power is determined according to the grid frequency and an average quantity of electricity of the N energy storage units in the step (c), and the control method adjusts the grid frequency to fall within a frequency range by performing the steps (d) and (e).

5. The control method according to claim 1, wherein in the step (d), the magnitude of the required power is greater than or equal to a product of the preset percentage and a sum of maximum powers of X power regulators corresponding to the first X energy storage units in the first sequence, and the magnitude of the required power is less than or equal to the sum of the maximum powers of the X power regulators corresponding to the first X energy storage units in the first sequence.

6. The control method according to claim 1, wherein the step (d) comprises substeps of:
(d1) selecting first one energy storage unit in the first sequence;
(d2) determining whether conditions (i), (ii) and (iii) are satisfied, wherein the condition (i) is that a product of the preset percentage and a sum of a maximum power of the power regulator corresponding to the selected energy storage unit is greater than the magnitude of the required power, the condition (ii) is that a product of the preset percentage and a sum of maximum powers of the power regulators corresponding to the selected energy storage unit and the energy storage unit next in the first sequence is greater than or equal to the magnitude of the required power, and the condition (iii) is that the sum of the maximum power of the power regulator corresponding to the selected energy storage unit is greater than or equal to the magnitude of the required power;
(d3) if the conditions (i), (ii) and (iii) are all satisfied, or if the condition (i) is not satisfied and the conditions (ii) and (iii) are satisfied, regarding the number of the selected energy storage unit as X; and
(d4) if the condition (i) is not satisfied and at least one of the conditions (ii) and (iii) is not satisfied, additionally selecting the energy storage unit next in the first sequence, and performing the substep (d2) again.

7. The control method according to claim 1, wherein in the step (e), the magnitude of the required power is greater than or equal to a product of the preset percentage and a sum of maximum powers of Y power regulators corresponding to the first Y energy storage units in the second sequence, and the magnitude of the required power is less than or equal to the sum of the maximum powers of the Y power regulators corresponding to the first Y energy storage units in the second sequence.

8. The control method according to claim 1, wherein the step (e) comprises substeps of:
(e1) selecting first one energy storage unit in the second sequence;
(e2) determining whether conditions (i), (ii) and (iii) are satisfied, wherein the condition (i) is that a product of the preset percentage and a sum of a maximum power of the power regulator corresponding to the selected energy storage unit is greater than the magnitude of the required power, the condition (ii) is that a product of the preset percentage and a sum of maximum powers of the power regulators corresponding to the selected energy storage unit and the energy storage unit next in the second sequence is greater than or equal to the magnitude of the required power, and the condition (iii) is that the sum of the maximum power of the power regulator corresponding to the selected energy storage unit is greater than or equal to the magnitude of the required power;
(e3) if the conditions (i), (ii) and (iii) are all satisfied, or if the condition (i) is not satisfied and the conditions (ii) and (iii) are satisfied, regarding the number of the selected energy storage unit as Y; and
(e4) if the condition (i) is not satisfied and at least one of the conditions (ii) and (iii) is not satisfied, additionally selecting the energy storage unit next in the second sequence, and performing the substep (e2) again.

9. The control method according to claim 1, wherein if time elapsed after last execution of the step (b) exceeds a preset duration, the control method performs the step (b) again.

10. An energy storage system, comprising:
a power grid;
an interconnection point, electrically connected to the power grid;
N energy storage modules, electrically connected to the interconnection point respectively, wherein N is an integer greater than 1, each of the N energy storage modules comprises a transformer, a power regulator and an energy storage unit electrically connected in series, and a high-voltage side and a low-voltage side of the transformer are electrically connected to the interconnection point and the power regulator respectively; and
a controller, communicating with the N energy storage modules, wherein the controller acquires quantity of electricity of N energy storage units of the N energy storage modules, obtains a first sequence by sorting the N energy storage units based on the quantity of electricity in descending order, and obtains a second sequence by sorting the N energy storage units based on the quantity of electricity in ascending order, and the controller determines a required power of the power grid according to a grid frequency of the power grid,
wherein when the required power is positive, the controller controls first X energy storage units in the first sequence to discharge for collectively providing an electrical energy, having same magnitude with the required power, to the power grid, and X is a positive integer less than or equal to N,
wherein when the required power is negative, the controller controls first Y energy storage units in the second sequence to collectively receive an electrical energy, having same magnitude with the required power, from the power grid for charging, and Y is a positive integer less than or equal to N,
wherein the controller adds up maximum powers of N power regulators corresponding to the N energy storage units to obtain a total power, and the controller multiplies the total power by a preset percentage to obtain a total ideal power; wherein if a magnitude of the required power is less than or equal to the total ideal power, X and Y are both less than N, and if the magnitude of the required power is greater than the total ideal power, X and Y are both equal to N.

11. The energy storage system according to claim 10, wherein according to a frequency-power relation curve of the power grid, the grid frequency corresponds to the required power; when the grid frequency is lower than a foundation frequency, the required power is positive, and the controller controls the first X energy storage units in the first sequence to provide electrical energy to the power grid till the grid frequency increases to the foundation frequency; and when the grid frequency is higher than the foundation frequency, the required power is negative, and the controller controls the first Y energy storage units in the second sequence to receive electrical energy from the power grid till the grid frequency decreases to the foundation frequency.

12. The energy storage system according to claim 11, wherein when the grid frequency falls within a frequency range comprising the foundation frequency, the required power is zero, and the controller maintains the grid frequency.

13. The energy storage system according to claim 10, wherein if the grid frequency corresponds to a power range according to a frequency-power relation curve of the power grid, the controller determines the required power according to the grid frequency and an average quantity of electricity of the N energy storage units; when the required power is positive, the controller controls the first X energy storage units in the first sequence to provide electrical energy to the power grid for adjusting the grid frequency to fall within a frequency range; and when the required power is negative, the controller controls the first Y energy storage units in the second sequence to receive electrical energy from the power grid for adjusting the grid frequency to fall within the frequency range.

14. The energy storage system according to claim 10, wherein when the required power is positive, the magnitude of the required power is greater than or equal to a product of the preset percentage and a sum of maximum powers of X power regulators corresponding to the first X energy storage units in the first sequence, and the magnitude of the required power is less than or equal to the sum of the maximum powers of the X power regulators corresponding to the first X energy storage units in the first sequence.

15. The energy storage system according to claim 10, wherein when the required power is positive, the controller is configured to:
select first one energy storage unit in the first sequence;
determine whether conditions (i), (ii) and (iii) are satisfied, wherein the condition (i) is that a product of the preset percentage and a sum of a maximum power of the power regulator corresponding to the selected energy storage unit is greater than the magnitude of the required power, the condition (ii) is that a product of the preset percentage and a sum of maximum powers of the power regulators corresponding to the selected energy storage unit and the energy storage unit next in the first sequence is greater than or equal to the magnitude of the required power, and the condition (iii) is that the sum of the maximum power of the power regulator corresponding to the selected energy storage unit is greater than or equal to the magnitude of the required power;
if the conditions (i), (ii) and (iii) are all satisfied, or if the condition (i) is not satisfied and the conditions (ii) and (iii) are satisfied, regard the number of the selected energy storage unit as X; and
if the condition (i) is not satisfied and at least one of the conditions (ii) and (iii) is not satisfied, additionally select the energy storage unit next in the first sequence, and determine whether the conditions (i), (ii) and (iii) are satisfied again.

16. The energy storage system according to claim 10, wherein when the required power is negative, the magnitude of the required power is greater than or equal to a product of the preset percentage and a sum of maximum powers of Y power regulators corresponding to the first Y energy storage units in the second sequence, and the magnitude of the required power is less than or equal to the sum of the maximum powers of the Y power regulators corresponding to the first Y energy storage units in the second sequence.

17. The energy storage system according to claim 10, wherein when the required power is negative, the controller is configured to:
select first one energy storage unit in the second sequence;

determine whether conditions (i), (ii) and (iii) are satisfied, wherein the condition (i) is that a product of the preset percentage and a sum of a maximum power of the power regulator corresponding to the selected energy storage unit is greater than the magnitude of the required power, the condition (ii) is that a product of the preset percentage and a sum of maximum powers of the power regulators corresponding to the selected energy storage unit and the energy storage unit next in the second sequence is greater than or equal to the magnitude of the required power, and the condition (iii) is that the sum of the maximum power of the power regulator corresponding to the selected energy storage unit is greater than or equal to the magnitude of the required power;

if the conditions (i), (ii) and (iii) are all satisfied, or if the condition (i) is not satisfied and the conditions (ii) and (iii) are satisfied, regard the number of the selected energy storage unit as Y; and if the condition (i) is not satisfied and at least one of the conditions (ii) and (iii) is not satisfied, additionally select the energy storage unit next in the second sequence, and determine whether the conditions (i), (ii) and (iii) are satisfied again.

18. The energy storage system according to claim 10, wherein if time elapsed after the controller obtaining the first sequence and the second sequence exceeds a preset duration, the controller re-obtains the first sequence and the second sequence.

* * * * *